US011208522B2

(12) United States Patent
O'Brien et al.

(10) Patent No.: US 11,208,522 B2
(45) Date of Patent: Dec. 28, 2021

(54) LOW VISCOSITY POLYOLS FOR POLYURETHANE APPLICATIONS

(71) Applicant: Stepan Company, Northfield, IL (US)

(72) Inventors: Michael Edward O'Brien, Hainesville, IL (US); Jeffrey R. Janos, Antioch, IL (US); Scott Yin, Buffalo Grove, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 16/734,911

(22) Filed: Jan. 6, 2020

(65) Prior Publication Data

US 2020/0140600 A1 May 7, 2020

Related U.S. Application Data

(63) Continuation of application No. PCT/US2018/039038, filed on Jun. 22, 2018.

(60) Provisional application No. 62/672,182, filed on May 16, 2018, provisional application No. 62/622,228, filed on Jan. 26, 2018, provisional application No. 62/529,873, filed on Jul. 7, 2017.

(51) Int. Cl.

| C08G 18/42 | (2006.01) |
|---|---|
| C08L 67/02 | (2006.01) |
| C08L 67/04 | (2006.01) |
| C08L 75/06 | (2006.01) |
| C08G 18/10 | (2006.01) |
| C08G 18/73 | (2006.01) |
| C08G 18/76 | (2006.01) |
| C08G 18/78 | (2006.01) |
| C08G 18/79 | (2006.01) |
| C08G 63/08 | (2006.01) |
| C08G 63/181 | (2006.01) |
| C08G 63/199 | (2006.01) |
| C08K 5/17 | (2006.01) |
| C08K 5/353 | (2006.01) |

(52) U.S. Cl.
CPC ............ *C08G 18/42* (2013.01); *C08G 18/10* (2013.01); *C08G 18/73* (2013.01); *C08G 18/76* (2013.01); *C08G 18/7831* (2013.01); *C08G 18/791* (2013.01); *C08G 63/08* (2013.01); *C08G 63/181* (2013.01); *C08G 63/199* (2013.01); *C08K 5/17* (2013.01); *C08K 5/353* (2013.01)

(58) Field of Classification Search
None
See application file for complete search history.

(56) References Cited

U.S. PATENT DOCUMENTS

| 5,631,343 | A | 5/1997 | Binns et al. | |
|---|---|---|---|---|
| 5,646,236 | A | 7/1997 | Schafheutle et al. | |
| 5,922,338 | A | 7/1999 | Brich et al. | |
| 5,922,682 | A | 7/1999 | Brich et al. | |
| 6,359,022 | B1 | 3/2002 | Hickey et al. | |
| 6,503,288 | B1 | 1/2003 | Markusch | |
| 6,664,363 | B1 | 12/2003 | Faunce | |
| 8,076,001 | B2 | 12/2011 | Fenn et al. | |
| 8,877,862 | B2 | 11/2014 | Alidedeoglu et al. | |
| 2003/0045653 | A1* | 3/2003 | Flosbach ............... | C09D 175/06 525/440.01 |
| 2004/0242831 | A1 | 12/2004 | Tian et al. | |
| 2005/0085658 | A1 | 4/2005 | Geiger et al. | |
| 2006/0057393 | A1 | 3/2006 | Reisch et al. | |
| 2008/0234410 | A1* | 9/2008 | Van Engelen ....... | C08G 18/246 523/507 |
| 2009/0247657 | A1 | 10/2009 | Kaplan et al. | |
| 2011/0237704 | A1 | 9/2011 | Guelcher et al. | |
| 2012/0156304 | A1 | 6/2012 | Tice | |
| 2012/0245246 | A1 | 9/2012 | Yin et al. | |
| 2013/0053461 | A1 | 2/2013 | Alidedeoglu et al. | |
| 2014/0170327 | A1 | 6/2014 | Dombrowski et al. | |
| 2015/0031848 | A1 | 1/2015 | Honcoop et al. | |
| 2015/0210807 | A1 | 7/2015 | Smits et al. | |
| 2016/0053089 | A1 | 2/2016 | Yoo et al. | |
| 2017/0002241 | A1 | 1/2017 | Ostlund et al. | |

FOREIGN PATENT DOCUMENTS

| CN | 105622911 | 6/2016 | |
|---|---|---|---|
| DE | 1020034 | 11/1957 | |
| EP | 3034534 | 6/2016 | |
| WO | WO-2010027758 A1 * | 3/2010 | ............... C08J 7/042 |

OTHER PUBLICATIONS

International Searching Authority, "International Search Report and Written Opinion," issued in connection with International Patent Application No. PCT/US18/39038, dated Sep. 13, 2018, 11 pages.
European Patent Office, Extended European Search Report, European Application No. 18828105.9, dated Mar. 9, 2021, 8 pages.

* cited by examiner

*Primary Examiner* — Michael J Feely
(74) *Attorney, Agent, or Firm* — McAndrews, Held & Malloy, Ltd.

(57) ABSTRACT

Lactide-based random polyester polyols for use in polyurethane compositions are disclosed. The polyester polyols have an OH value in the range of greater than 400 mg KOH/g up to 1100 mg KOH/g and are the reaction product of at least one polycarboxylic acid, at least one lactide, and one or more polyalcohols. The polyester polyols can be formulated into the B-side of a two part polyurethane composition to obtain a polyurethane having improved hardness and solvent resistance and a low VOC content. The polyurethane composition is particularly suitable for polyurethane coating applications.

25 Claims, 5 Drawing Sheets

LOW VISCOSITY POLYOLS FOR POLYURETHANE APPLICATIONS

CROSS REFERENCE TO RELATED APPLICATIONS

This application is a continuation of PCT application No. PCT/US2018/39038, filed Jun. 22, 2018, which claims priority to U.S. Provisional Application No. 62/529,873, filed Jul. 7, 2017, and U.S. Provisional Application No. 62/622,228, filed Jan. 26, 2018, and U.S. Provisional Application No. 62/672,182, filed May 16, 2018. The entire specifications of the PCT and provisional applications referred to above are hereby incorporated by reference.

BACKGROUND OF THE INVENTION

The present technology relates to lactide-based polyester polyols, and to polyurethane compositions comprising the lactide-based polyester polyols.

Polyurethanes have been used in a wide variety of applications, including coatings for various substrates, such as plastics, wood, glass, metal, and concrete. Important properties for such polyurethane coatings include abrasion and chemical resistance, and hardness. Polyester polyol resins used in preparing polyurethane coatings often have viscosities of greater than 15,000 cps at 25° C., and therefore require solvents to reduce the viscosity of the resins for easier handling and formulation into polyurethane coating compositions.

Recently, there has been a greater emphasis on reducing the amount of volatile organic compounds (VOCs) being released into the environment. Stricter regulations limiting VOCs have been proposed, making it important to limit or eliminate solvents from polyester resins, and polyurethane compositions employing such resins.

There remains a need in the art to provide polyester polyols that have a reduced viscosity, such as less than 15,000 cps at 25° C., thereby reducing or eliminating the need to include solvents to facilitate use of the polyester polyols in polyurethane formulations and applications.

There is also a need for low or no VOC polyester polyols that can provide equivalent or improved physical properties compared to solvent-borne polyester polyols, when used in polyurethane compositions.

SUMMARY OF THE INVENTION

In one aspect, the present technology relates to lactide-based random polyester polyols that comprise the reaction product of (a) at least one polycarboxylic acid, or an anhydride, halide, alkyl ester or lactone derivative thereof; (b) at least one lactide, lactic acid, lactic acid derivative, or combinations thereof; and (c) one or more polyalcohols, wherein the random polyester polyol has an Acid Value of 10 mg KOH/g or less, and a hydroxyl value of greater than 400 up to 1100 mg KOH/g.

In a further aspect, the present technology relates to a polyester polyol blend for preparing a polyurethane composition, wherein the polyester polyol blend comprises:
  (a) a random polyester polyol comprising the reaction product of:
    (i) at least one polycarboxylic acid;
    (ii) at least one lactide, lactic acid, lactic acid derivative, or a combination thereof; and
    (iii) one or more polyalcohols,
      wherein the random polyester polyol has a hydroxyl value of greater than 400 up to 1100 mg KOH/g;
  (b) optionally, at least one oxazolidine in an amount of 0% to 60% by weight based on the weight of the polyester polyol composition; and
  (c) optionally, one or more additional components having functional groups reactive with an isocyanate group.

In a still further aspect, the present technology relates to a polyester polyol blend for preparing a polyurethane composition, wherein the polyester polyol blend comprises:
  (a) a random polyester polyol comprising the reaction product of:
    (i) at least one polycarboxylic acid;
    (ii) at least one lactide, lactic acid, lactic acid derivative, or a combination thereof; and
    (iii) one or more polyalcohols,
      wherein the random polyester polyol has a hydroxyl value of greater than 400 up to 1100 mg KOH/g;
  (b) optionally, at least one ketimine resin in an amount of 0% to 60% by weight based on the weight of the polyester polyol composition; and
  (c) optionally, one or more additional components having functional groups reactive with an isocyanate group.

In another aspect, the present technology relates to a 2-part polyurethane coating composition comprising an A-side and a B-side, wherein the B-side comprises:
  (1) a random polyester polyol that is the reaction product of:
    (a) at least one polycarboxylic acid;
    (b) at least one lactide, lactic acid, lactic acid derivative, or a combination thereof; and
    (c) one or more polyalcohols, wherein the random polyester polyol has an OH value of greater than 400 up to 1100 mg KOH/g; and
  (2) optionally, at least one oxazolidine in an amount of 0% to 60% by weight based on the total weight of the B-side; and
    wherein the A-side comprises at least one aliphatic or aromatic isocyanate, polyisocyanate, or a combination thereof.

In another aspect, the present technology relates to a 2-part polyurethane coating composition comprising an A-side and a B-side, wherein the B-side comprises:
  (1) a random polyester polyol that is the reaction product of:
    (a) at least one polycarboxylic acid;
    (b) at least one lactide, lactic acid, lactic acid derivative, or a combination thereof; and
    (c) one or more polyalcohols, wherein the random polyester polyol has an OH value of greater than 400 up to 1100 mg KOH/g; and
  (2) optionally, at least one ketimine resin in an amount of 0% to 60% by weight based on the total weight of the B-side; and
    wherein the A-side comprises at least one aliphatic or aromatic isocyanate, polyisocyanate, or a combination thereof.

In a still further aspect, the present technology relates to a cross-linked polyurethane coating comprising the reaction product of:
  (a) at least one aliphatic or aromatic isocyanate, polyisocyanate, or a combination thereof; and
  (b) a polyester polyol that is the reaction product of:
    (i) at least one polycarboxylic acid;
    (ii) at least one lactide, lactic acid, lactic acid derivative, or a combination thereof; and
    (iii) one or more polyalcohols, wherein the polyester polyol has an OH value of greater than 400 up to about 1100 mg KOH/g;

(c) optionally, one or more additional components having functional groups reactive with the isocyanate, polyisocyanate or a combination thereof; and (d) optionally, oxazolidine in an amount of 0% to 60% by weight, based on the combined weight of (b), (c), and (d).

In a still further aspect, the present technology relates to a cross-linked polyurethane coating comprising the reaction product of:

(a) at least one aliphatic or aromatic isocyanate, polyisocyanate, or a combination thereof; and (b) a polyester polyol that is the reaction product of:
  (i) at least one polycarboxylic acid;
  (ii) at least one lactide, lactic acid, lactic acid derivative, or a combination thereof; and
  (iii) one or more polyalcohols,
  wherein the polyester polyol has an OH value of greater than 400 up to about 1100 mg KOH/g;

(c) optionally, one or more additional components having functional groups reactive with the isocyanate, polyisocyanate, or a combination thereof; and (d) optionally, ketimine in an amount of 0% to 60% by weight, based on the combined weight of (b), (c), and (d).

DETAILED DESCRIPTION OF THE PREFERRED EMBODIMENTS

The term "functionality" as used herein means the number of reactive groups, e.g., hydroxyl groups, in a molecule.

The term "hydroxyl value" or "OH value" or "OHV" as used herein refers to a quantitative measure of the concentration of hydroxyl groups, usually stated as mg KOH/g, i.e., the number of milligrams of potassium hydroxide equivalent to the hydroxyl groups in 1 g of substance.

The term "lactide" as used herein refers to the cyclic diester of lactic acid, and includes all sterioisomeric forms (L-lactide, D-lactide, meso-lactide, racemic lactide), and mixtures thereof.

The term "lactic acid" as used herein refers to 2-hydroxypropionic acid. "Lactic acid derivatives" include the salt forms of lactic acid, lactic acid esters, and lactic acid halides.

The term "polyhydric alcohol" or "polyalcohol" as used herein includes diols, triols, and higher functionality hydroxyl-containing compounds having an average functionality of greater than three.

The term "polycarboxylic acid" as used herein includes dicarboxylic acids, tricarboxylic acids, and higher functionality carboxylic acids having more than three carboxylic acid groups. "Polycarboxylic acid derivatives" include anhydrides, halides, lactones, and alkyl esters.

The term "polyester polyol" as used herein means a polyol having ester linkages.

The term "low amount" or "low VOC" as used herein refers to an amount of volatile organic compounds in the polyurethane composition that is less than 200 g/liter, or less than 150 g/liter, or less than 125 g/liter, measured in accordance with EPA Method 24 for Analysis of Total Volatiles.

While the present technology will be described in connection with one or more preferred embodiments, it will be understood by those skilled in the art that the technology is not limited to only those particular embodiments. To the contrary, the present technology includes all alternatives, modifications, and equivalents as may be included within the spirit and scope of the appended claims.

The present technology encompasses a lactide-based random polyester polyol that is the reaction product of a lactide, or lactic acid or a derivative thereof, reacted with at least one polycarboxylic acid, or an anhydride, halide, alkyl ester, or lactone derivative thereof, and one or more polyhydric alcohols (polyalcohols). The polyester polyols can be used in polyurethane compositions, such as polyurethane compositions for polyurethane coating, adhesive, sealant, elastomer, or foam applications. The present technology also encompasses polyurethane compositions comprising the lactide-based polyester polyol, and polyurethane coatings made from the polyurethane compositions.

Polyester Polyol

The lactide-based random polyester polyol of the present technology is prepared in a single step by reacting at least one lactide, or lactic acid or a derivative thereof, at least one polycarboxylic acid, or an anhydride, halide, alkyl ester, or lactone derivative thereof, and one or more polyalcohols.

Lactide Component

A lactide is the dimeric cyclic ester of lactic acid and exists as three optical isomers: L-lactide, formed from two L-lactic acid molecules, D-lactide, formed from two D-lactic acid molecules, and meso-lactide, formed from L-lactic acid and D-lactic acid. Racemic lactide is a mixture of L-lactide and D-lactide. The lactide as used herein can be pure L-lactide, pure D-lactide, meso (DL)-lactide, or a racemic mixture thereof. Lactides are available commercially from several suppliers. One commercially available lactide suitable for use in preparing the polyester polyol is PURALACT® B3, a lactide available from Corbion. Alternatively, lactic acid or a lactic acid derivative, such as a lactic acid salt, could be used as the lactide component, either alone or in combination with the lactide. The amount of lactide or lactic acid in the polyester polyol can be from about 1% to about 40% by weight, alternatively about 1% to about 35%, alternatively about 5% to about 35%, alternatively about 5% to about 28% by weight, based on the total weight of the components forming the polyester polyol.

Polycarboxylic Acid Component

The polycarboxylic acid component can be aliphatic, cycloaliphatic, and/or aromatic, and includes one or more dicarboxylic acids, tricarboxylic acids, higher functionality carboxylic acids, or mixtures of such acids. Suitable dicarboxylic acids include straight or branched aliphatic diacids, cycloaliphatic diacids, or mixtures thereof, having from 4 to 22 carbon atoms, including the carbon atoms contained in the carboxy group, and aromatic dicarboxylic acids having a total of 8 to 16 carbon atoms. Derivatives of these dicarboxylic acids, such as anhydrides, halides, lactones, or alkyl esters of diacids, can also be used in the present technology. Preferred aliphatic dicarboxylic acids are diacids having from 4 to 16 carbon atoms, alternatively from 6 to 12 carbon atoms. Representative examples of dicarboxylic acids include glutaric acid, adipic acid, succinic acid, maleic acid, fumaric acid, sebacic acid, pimelic acid, octanedioic acid, dodecanedioic acid, azelaic acid, phthalic acid, terephthalic acid, and isophthalic acid. When the polycarboxylic acid component comprises one or more aromatic dicarboxylic acids, the resulting polyester polyol may have an increased viscosity, necessitating the use of a solvent with the polyester polyol. Therefore, if aromatic dicarboxylic acids are included, it may be desirable to keep the amount low enough that the viscosity of the polyester polyol is not adversely increased. Representative examples of triacids or higher functional polyacids include citric acid, isocitric acid, trimellitic acid, pyromellitic acid, trimellitic anhydride, and pyromellitic anhydride. The amount of polycarboxylic acid can be from about 10% to about 70% by weight, alternatively about 10% to about 59% by weight, alternatively about 10% to about 55% by weight, based on the total weight of the components forming the polyester polyol.

Polyalcohol Component

The polyalcohol component can be straight or branched, and includes one or more diols, triols, or higher functional polyols having an average functionality of greater than three, or mixtures thereof. Examples of diols include ethylene glycol, diethylene glycol, triethylene glycol, propylene glycol, dipropylene glycol, trimethylene glycol, butylene glycols, neopentyl glycol, 2,2-dimethyl-1,3 propane diol, 1,6-hexanediol, 2-methyl-1,3-propanediol, 1,3-propane glycol, 1,3-butanediol, 1,4-butanediol, 1,5-pentanediol, 1,2-cyclohexanediol, 1,3-cyclohexanediol, 1,3-cyclohexanedimethanol, 1,4-cyclohexanedimethanol, resorcinol, hydroquinone, and poly(oxyalkylene) polyols derived by the condensation of ethylene oxide, propylene oxide, or a combination thereof. Mixtures of any of the diols are also contemplated. Suitable triols and higher functional polyalcohols having an average functionality of greater than three include glycerol, diglycerol, trimethylol propane, pentaerythritol, dipentaerythritol, and their alkoxylated derivatives, such as ethoxylated trimethylolpropane and propoxylated trimethylolpropane; sugars, such as sucrose, glucose, and fructose; sugar alcohols, such as sorbitol and mannitol, and combinations of any of the foregoing. Also suitable are the alkoxylated diols, triols, and higher functional polyols commercially available from Perstorp. When the polyalcohol is alkoxylated, the amount of alkoxylation can range from two to about fifteen units of alkoxylation. The alkoxylation units can be ethylene oxide, propylene oxide, butylene oxide, or a combination thereof. A mixture of diols, triols, and/or higher functional polyalcohols is preferred in some embodiments to impart higher functionality to the resulting polyester polyol. In some embodiments, the polyalcohol component is a mixture of neopentyl glycol and trimethylol propane. In other embodiments, the polyalcohol component is a mixture of neopentyl glycol, trimethylolpropane, and trimethylolpropane ethoxylate. The amount of the polyalcohol component can be from about 29% to about 89% by weight, alternatively about 40% to about 80%, based on the total weight of the components forming the polyester polyol. It should be understood that the total weight of the components forming the polyester polyol add up to 100%. The weight ratio of the polyalcohol component to the lactide component forming the polyester polyol can be from 60:1 to 0.7:1, alternatively, 10:1 to 0.8:1, alternatively 10:1 to 0.9:1, alternatively 10:1 to 1.0:1, alternatively 5:1 to 1.1:1.

Optional Components

The polyester polyol of the present technology may also comprise additional optional components. For example, natural oils, such as soybean or castor oil, can be incorporated into the backbone of the polyester polyol to modify or enhance desired properties of the polyester polyol and the polyurethane compositions formed therefrom. Amounts of natural oil can range from 0% up to about 30%, depending on the end use formulation and application.

The polyester polyols of the present technology are prepared by adding all of the components into a suitable vessel, and subjecting the component mixture to heating, or heating under reduced pressure, in the presence of a catalyst, if necessary, until the reaction product has an Acid Value of less than 10.0, alternatively 5.0 or less, alternatively 2.5 or less, alternatively 2.0 or less, alternatively 1.5 or less, alternatively 1.0 or less, preferably less than 0.8. Catalysts for the reaction can be a transition metal catalyst selected from the group consisting of titanates, zirconates, tin based catalysts, tetraisopropyl titanate, tetrabutyltitanate, dibutyl tin oxide, oxides of zinc, oxides of lead, oxides of antimony, and combinations thereof. Other catalysts, such as alkali metal catalysts or Lewis or Bronsted acids can also be used. The resulting polyester polyol has an OH value of greater than 400 mg KOH/g up to about 1100 mg KOH/g, alternatively greater than 400 to about 800 mg KOH/g, alternatively greater than 400 to about 700 mg KOH/g, alternatively greater than 400 to about 600 mg KOH/g, and an average molecular weight of less than about 900 g/mol. The polyester polyol has a viscosity of less than about 15,000 cps at 25° C., alternatively less than about 12,000 cps at 25° C., alternatively less than about 10,000 cps at 25° C., alternatively about 500 cps to less than about 15,000, alternatively about 500 cps to less than about 10,000 cps, alternatively about 700 cps to less than about 10,000 cps, alternatively about 800 cps to less than about 10,000 cps, alternatively about 1,000 cps to less than about 10,000 cps at 25° C. The polyester polyol also has a functionality of greater than or equal to about 2.0, preferably greater than 2.0. Suitable functionalities can range from greater than 2 to about 6, although higher functionalities are also contemplated.

Polyurethane Compositions

The polyurethane compositions of the present technology are prepared by reacting at least one isocyanate with the polyester polyol of the present technology, and optionally one or more additional components to form a polyurethane reaction product. In some embodiments, the polyurethane composition is a one part moisture-cured polyurethane composition. Such compositions can be prepared by reacting the polyester polyol of the present technology with an excess of isocyanate to form an isocyanate-terminated polyurethane prepolymer. In these one-part polyurethane compositions, the measured amount of NCO content in the prepolymer can be between about 1% up to about 48% NCO. In other embodiments, the polyurethane composition is a two-part polyurethane composition that combines a "B-side" that comprises the polyester polyol of the present technology, with an "A-side" that comprises at least one isocyanate.

The B-side comprises the polyester polyol of the present technology in an amount of about 30% to about 95% by weight, based on the weight of the B-side components. The B-side also typically contains a suitable urethane catalyst.

Such catalysts are known in the art and include tertiary amine compounds, amines with isocyanate reactive groups, and organometallic compounds. Exemplary organometallic catalysts include organomercury, organolead, organoferric and organotin catalysts. Other suitable catalysts include one or more members selected from the group consisting of metal catalysts, such as an alkali metal alkoxide such as potassium octoate, stannous octoate, stannous chloride, tin salts of carboxylic acids such as dibutyltin dilaurate, bismuth neodecanoate, and amine compounds, such as triethylenediamine (TEDA), N-methylimidazole, 1,2-dimethylimidazole, N-methylmorpholine, N-ethylmorpholine, trimethylamine, triethylamine, N,N'-dimethylpiperazine, 1,3,5-tris(dimethylaminopropyl)hexahydrotrazine, 2,4,6-tris(dimethylaminomethyl)phenol, N-methyldicyclohexylamine, N,N-dimethylcyclohexylamine, tetramethylethylenediamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine, 1-methyl-4-dimethylaminoethylpiperazine, 3-methoxy-N-dimethylpropylamine, N-ethylmorpholine, N-cocomorpholine (CAS No. 72906-09-3, a product of BASF SE, Ludwigshafen, Germany), N,N-dimethyl-N',N'-dimethyl isopropylpropylenediamine, N,N-diethyl-3-diethylaminopropylamine, diethylethanolamine, 3-methoxypropyldimethylamine, N,N,N'-trimethylisopropyl propylenediamine, 3-diethylaminopropyl-diethylamine, and dimethylbenzylamine, as well as any mixture thereof. The amount of catalysts can vary from greater than 0 to about 5% by weight of the total B-side components, such as about 0.05 to about 5% by weight, or about 0.1 to about 5% by weight of the total B-side components.

It has been found that, in some embodiments, the addition of an oxazolidine resin or ketimine resin to the B-side components can provide a surprising increased hardness in the polyurethane coating or material resulting from reacting the A-side and B-side compositions. In some embodiments, polyurethane coatings prepared with aliphatic isocyanates and a B-side composition containing the oxazolidine resin have a hardness level that approaches that of standard epoxy coatings, which has typically been difficult to achieve with polyurethane coatings. In other embodiments, polyurethane coatings prepared from aromatic isocyanates and a B-side composition containing the oxazolidine resin have a hardness level that is similar to that of standard epoxy coatings. The oxazolidine resin can be present in the B-side composition in an amount of 0% to about 60% by weight, based on the total weight of the B-side components. In some embodiments, polyurethane materials prepared with a B-side composition containing at least one ketimine resin can provide improved Shore D hardness and chemical resistance of the polyurethane material compared to standard industrial coatings or materials. The ketimine resin can be present in the B-side composition in an amount of 0% to about 60% by weight, alternatively 0% to about 50% by weight, based on the weight of the B-side components.

Depending on the desired properties, the B-side may optionally contain additional polyols, or other compounds or resins having groups that are reactive with the isocyanate groups. Such additional components can include, but are not limited to, aliphatic and/or aromatic polyester polyols, polyether polyols, polyester polyether polyols, polycarbonate polyols, acrylic polyols, amine polyols, polycaprolactones, silicones, hydroxyl-containing thioethers, and aspartic resins. Additional aliphatic polyols can be glycol derivatives, such as polyethylene glycol, polypropylene glycol, or a mixture thereof. Desirable glycols have an average molecular weight of about 400 or less. Optional aromatic polyester polyols can be, for example, aromatic polyester polyols that are the reaction product of phthalic acid, isophthalic acid, terephthalic acid or phthalic anhydride reacted with an excess of diol or higher functional polyalcohol (for example, any of the diols or polyalcohols noted above). The B-side may also comprise polyether polyols having a molecular weight of 250 or higher, such as polyoxyethylene glycols, polyoxypropylene glycols, or combinations thereof. Suitable amounts of additional compounds or resins will depend upon the desired properties and end use for the polyurethane compositions, and the overall compatibility of the components in the polyurethane compositions.

The B-side can also contain optional additives. For example, the additives can include one or more of defoaming agents, pigments, UV stabilizers, wetting agents, leveling agents, corrosion inhibitors, reactive diluents, or any combination thereof. Although additives are typically incorporated into the B-side, it is understood that they could also be incorporated into the A-side portion when the additive is compatible with the isocyanate compound. In general, pigments can comprise from 0% to about 60% by weight based on the total weight of the B-side components. Suitable amounts of other additives will depend on the end use of the polyurethane composition, and one skilled in the art can determine appropriate amounts.

The isocyanate-containing "A-side" comprises an isocyanate component, preferably a polyisocyanate component. A polyisocyanate is herein defined as having two or more isocyanate functionalities. Examples of suitable polyisocyanates include conventional aliphatic, cycloaliphatic, and aromatic isocyanates or mixtures thereof, having a nominal functionality in the range of about 2.25 to about 4. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate (HDI), and biuret or trimers of HDI; cycloaliphatic diisocyanates such as 1,3- and 1,4-cyclohexane diisocyanate, as well as any mixtures of these isomers, 1-isocyanato-3,3,5-trimethyl-5-isocyanatomethylcyclohexane (isophorone diisocyanate), 2,4- and 2,6-hexahydrotoluene diisocyanate and the corresponding isomeric mixtures, 4,4'-2,2'- and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates, naphthylene-1,5-diisocyanate, polyphenylene polymethylene polyisocyanates (crude MDI); naphthalene-1,5-diisocyanate, and triphenylmethane-4,4'4'-triisocyanate.

In one embodiment, the polyisocyanate component used in the A-side portion is a biuret or isocyanurate of hexamethylene diisocyanate (HDI) having a nominal functionality of approximately 3, and an NCO content of approximately 23 weight percent.

The polyurethane coating or material of the present technology can be prepared by reacting the A-side and B-side in a proportion of NCO to OH groups of about 0.9:1 to about 1.3:1, preferably about 1.05:1 (excess isocyanate). The A-side and B-side can be mixed and applied to a substrate by any standard means known in the art, such as rolling, brushing, spraying, electrostatic spraying, or dipping. Numerous suitable substrates include metal, wood, glass, plastics, and cements. The polyurethane coating can be used alone or in combination with one or more additional coatings. For example, the polyurethane composition comprising the A-side and the B-side can be applied as a primer or base coating, or alternatively as a top coating. After applying the polyurethane composition to the substrate, the polyurethane reaction product is allowed to cure into the final polyurethane coating. Curing temperatures can range from about 0° C. to about 200° C.

The polyurethane coating has several advantageous properties. A particular advantage is that less solvent is required for the polyurethane composition due to the lower viscosity (i.e. less than 15,000 cps at 25° C.) of the polyester polyols of the present technology. As a result, the polyurethane compositions and coatings of the present technology have low VOC amounts, due to less solvent being required for handling the lower viscosity polyester polyols. In some embodiments, the VOC amounts in the polyurethane composition are less than 200 g/liter, alternatively less than 150 g/liter, alternatively less than 125 g/liter, measured according to EPA Method 24 for analysis of Total Volatiles. The polyurethane coatings of the present technology also have better abrasion resistance and hardness levels than current industrial standards. In some embodiments, the polyurethane coatings have a König hardness of greater than 60 oscillations. The polyurethane coatings also have equal or better chemical resistance and comparable gloss levels compared to standard industrial coatings, and substantially equivalent physical properties in comparison to epoxy and acrylic urethane coatings. The polyurethane coatings of the present technology are particularly suitable for use as a floor or general purpose maintenance coating, although other uses are also contemplated.

The presently described technology and its advantages will be better understood by reference to the following examples. These examples are provided to describe specific embodiments of the present technology. By providing these examples, the inventors do not limit the scope and spirit of the present technology.

The following test methods are used to determine properties and performance of the polyurethane coating composition and resulting coating.

Tabor abrasion testing is performed in accordance with ASTM D4060-10, using a CS-17 wheel with 1,000 gram load, and 1,000 cycles. Gloss is measured in accordance with ASTM D523-14 at 60° gloss. Shore D hardness is measured in accordance with ASTM D2240-05, and König hardness is measured in accordance with ASTM D4366-14. Pencil hardness is measured in accordance with ASTM D3363-05. Adhesion of the coating to a substrate is measured according to ASTM D 3359-95a. The VOC content is calculated according to EPA Method 24 for Analysis of Total Volatiles.

Chemical resistance testing is performed by preparing a sample of polyurethane reaction product weighing approximately 3.5 g, and immersing the sample into the desired testing solution for 4 weeks. The sample weight is measured periodically, and the change in total weight of the sample after the duration of the test is recorded.

Weathering testing is conducted according to ASTM G154, Cycle 1 in a QUV Accelerated Weather Tester (Q-Panel). The test assesses UV resistance and stability of a coating by measuring color change ($\Delta E$) and gloss. Color change is assessed in accordance with ASTM D2244-14. The test conditions are shown in the Table below. Samples used in this test were aluminum panels. No UV stabilizers were added to any of the comparative or example formulations.

ASTM G154 Cycle 1 Test Conditions

Lamp Type: UVA-340

| Step | Function | Irradiance (W/m2) | Temperature (° C.) | Time (hours:minutes) |
| --- | --- | --- | --- | --- |
| 1 | UV | 0.89 | 60 | 8:00 |
| 2 | Condensation | n/a | 50 | 4:00 |
| 3 | Final step-Go to Step 1 | | | |

The samples were run for 2000 hours and the 60 degree gloss and change in color ($\Delta E$) were monitored throughout the test. Samples were rotated every 250 hours. For gloss, a BYK-Gardner Micro-TRI-gloss meter was used to make the measurements. The gloss measurements were done at different time intervals throughout the test. For color change measurements, ($\Delta E$), an X-Rite spectrophotometer was used. In this test, only the $L^*$, $a^*$ and $b^*$ measurements were made at different time intervals to calculate the color change ($\Delta E$). In the $L^*$, $a^*$, $b^*$, color space, component $L^*$ refers to the lightness coordinate; component $a^*$ refers to the red/green coordinate, with +a indicating red, and −a indicating green; component $b^*$ refers to the yellow/blue coordinate, with +b indicating yellow, and −b indicating blue. Delta E represents the overall sample difference in $L^*$, $a^*$, $b^*$ coordinates. The lower the $\Delta E$ value, the least color change in the sample. Ideally, the $\Delta E$ value would be 0, indicating no color change occurred. Delta $b^*$ represents the difference in the $b^*$ coordinate values of the sample, and is an indication of the amount of yellowing of the sample. The lower the $\Delta b^*$ value, the less yellowing of the sample.

Example 1: Preparation of Polyester Polyol

Adipic acid (686 g), Lactide (457 g), neopentyl glycol (546 g) and trimethylolpropane (793 g) were added to a reaction flask equipped with an overhead stirrer, thermocouple, nitrogen sparge line and distillation head. The contents were heated to 170-220° C. under nitrogen. When the acid value reached 15-20 mg KOH/g, a titanium based catalyst (0.12 g) was added and the reaction was allowed to continue until the acid value was less than 0.8 mg KOH/g. The final analysis of the polyol was as follows: Acid value: 0.24 mg KOH/g; Hydroxyl value: 424.2 mg KOH/g; % Water: 0.01%; Viscosity at 25° C.: 9,418 cP; at 80° C.: 148 cP.

Example 1A: Polyester Polyol

A polyester polyol was prepared using the method of Example 1, except that the reactants were adipic acid, lactide, neopentyl glycol, trimethylolpropane, and trimethylolpropane ethoxylate having an average of 3 EO units (TMP3EO). The measured properties of the polyester polyol were: Hydroxyl value: 449 mg KOH/g, viscosity: 2,800 cP at 25° C.

Example 2: Preparation of Polyurethane Coating Composition

Polyester polyols prepared in accordance with Example 1 were formulated into polyurethane coatings following the general procedure set forth below.

General Procedure for Making Urethane Coating
1. Polyol resin is added to a pint glass jar.
2. For formulations using an oxazolidine water scavenger (Incozol® 2), the additive is added and mixed at low speed on a benchtop mixer fitted with a small Jiffy blade for 15 minutes. The jar is sealed and allowed to rest for a minimum of 18 hours to allow Incozol® 2 to react with any residue moisture.
3. All remaining B-side ingredients are then added to the jar and mixed a minimum of 15 mins. on a benchtop air mixer fitted with a small Jiffy blade at low speed.
4. Immediately before use, the specified amount of isocyanate (A-side) is added to the completed B-side formulation and mixed for approximately 5 minutes using a benchtop air mixer fitted with a Jiffy blade at low speed.
5. A small amount of activated clear urethane formulation is poured onto a cold-rolled steel panel, aluminum panel or Leneta card and the mixture is drawn down using a 150 micron wire-wound drawdown bar.

Formulation 1 comprises the polyester polyol according to Example 1, without any addition of oxazolidine resin; Formulations 2, 3, and 4 comprise the polyester polyol according to Example 1 in combination with different amounts of the oxazolidine resin, in particular, amounts of 10%, 20%, and 30% by weight, respectively. The components of each of Formulations 1-4 are shown in Table 1. Also shown in Table 1 are two comparative formulations, Comparative 1 and Comparative 2. Comparative 1 comprises a branched polyester polyol diluted in 1-methoxypropylacetate (65% solids) as the polyester polyol component. Comparative 2 comprises a high solids (80% solids) acrylic polyol in n-methylamylketone solvent, as the polyol component.

TABLE 2

| Polyol | VOC (g/L) | 60° Gloss | Taber Abrasion (mg loss) | Hardness Shore D | Hardness König | Hardness Pencil |
|---|---|---|---|---|---|---|
| Formulation 1 | 82 | 90.2 | 25 | 64 | 61 | F |
| Formulation 2 | 75 | 91.4 | 18.7 | 70 | 82 | — |
| Formulation 3 | 61 | 90.6 | 21 | 77 | 97 | 2B |
| Formulation 4 | 54 | 89.1 | 22.6 | 75 | 101 | — |
| Comparative 1 | 345 | 94.8 | 29.8 | 42 | 75 | F |
| Comparative 2 | 207 | 86.8 | 74 | 20 | 77 | 2B |

Example 2A: Preparation of Polyurethane Coating Composition

A polyester polyol prepared in accordance with Example 1A was formulated into a polyurethane coating, following the general procedure of Example 2. N-butyl acetate was used to adjust activated coating viscosities to 1000 cP at 25° C. when blended with a standard HDI biuret polyisocyanate at a stoichiometric mix of 1 to 1. A standard low viscosity polyether-polyester hybrid resin was formulated in the same manner to prepare a further comparative formulation, Comparative 3. Table 3 shows the general formulation used to make Formulation 1A, comprising the polyester polyol prepared according to Example 1A, and the Comparative 3 formulation.

TABLE 1

|  | Formulation 1 | Formulation 2 | Formulation 3 | Formulation 4 | Comparative 1 | Comparative 2 |
|---|---|---|---|---|---|---|
| B-Side |  |  |  |  |  |  |
| Example 1 Polyester polyol (100% solids) | 100 | 100 | 100 | 100 |  |  |
| Branched polyester polyol (65% solids) |  |  |  |  | 100 |  |
| Acrylic polyol (80% solids) |  |  |  |  |  | 100 |
| Incozol ® 2 moisture scavenger | 2 | 2 | 2 | 2 | 2 |  |
| Incozol ® LV diluent | 0 | 10 | 20 | 30 | 0 | 0 |
| Byk ® A 530 defoaming agents | 1.7 | 1.91 | 2.13 | 2.35 | 0.87 |  |
| Byk ® 361N leveling agent | 0.73 | 0.82 | 0.91 | 1.01 | 0.37 | 0.37 |
| Byk ® 067A defoaming | 1.21 | 1.36 | 1.52 | 1.68 | 0.62 |  |
| n-Butyl acetate (n-BA)* | 21.08 | 15.78 | 13.27 | 12.29 | 23.74 | 11.05 |
| 1% DBTDL in nBA | 2.42 | 2.63 | 2.84 | 3.05 | 1.26 | 1.16 |
| A-Side |  |  |  |  |  |  |
| Desmodure ® N 3200 | 142.35 |  |  | 184.14 | 59.03 | 36.6 |
| Basonat ® HB 100 |  | 162.86 |  | 205.42 |  |  |
| wt. solids | 90.71 | 93.16 | 94.41 | 95.05 | 68.05 | 78.42 |
| VOC (g/L) | 102 | 75 | 61 | 54 | 345 | 207 |
| density (lbs./gal) | 9.18 | 9.18 | 9.20 | 9.20 | 9.00 | 8.00 |
| Hardness |  |  |  |  |  |  |
| Shore D | 55 | 70 | 77 | 75 | 42 | 20 |

*Solvent was added in amount to obtain a target viscosity of 1,000 cps for each formulation.
Incozol ® 2 oxazolidine moisture scavenger from Incorez Ltd.
Incozol ® LV reactive diluent from Incorez Ltd.
Byk ® A530 - silicone and polymeric defoamer from Byk.
Byk ® 361N - polyacrylate leveling agent from Byk.
Byk ® 067A - non-aqueous polysiloxane defoamer from Byk.
Desmodur ® N3200 - aliphatic polyisocyanate resin from Covestro.
Basonat ® HB100 - aliphatic polyisocyanate resin from BASF.

TABLE 3

| Raw Material | Amount (pbw) |
|---|---|
| B-Side | |
| Polyol | 34-54 |
| Solvent | 1-32 |
| Oxazolidine | 0-1 |
| Catalyst | <1 |
| Leveling Agent | ~0.25 |
| Air Release Agents/Defoamers | <2 |
| A-Side | |
| HDI Biuret Polyisocyanate | 25-56 |
| TOTAL | 100 |

In addition to the Formulation 1A and the Comparative 3 formulations, aspartic ester (Aspartic) and cycloaliphatic amine epoxy (Epoxy) formulations were developed for comparison purposes. Tables 4 and 5 show these formulations.

TABLE 4

Aspartic Ester Formulation-Comparative 4

| Raw Material | Amount (pbw) |
|---|---|
| B-Side | |
| Polyaspartic Resin (1) | 15.2 |
| Polyaspartic Resin (2) | 30.5 |
| Aldimine Diluent | 6.1 |
| Air Release Agent | 0.75 |
| Leveling agent | 0.25 |
| Solvent | 8.4 |
| A-Side | |
| Low visc. HDI Trimer Polyisocyanate | 38.8 |
| TOTAL | 100 |

TABLE 5

Epoxy Formulation-Comparative 5

| Raw Material | Amount (pbw) |
|---|---|
| Standard Liquid Epoxy | 66.1 |
| Epoxy Diluent | 5.7 |
| Adhesion Promoter | 0.7 |
| Air Release Agent | 0.5 |
| Cycloaliphatic Amine | 27.0 |
| TOTAL | 100 |

The base resins in the formulations were each evaluated for viscosity at 25° C. (cP). Formulation 1A and Comparative formulations 1-5 were evaluated for VOC content, abrasion resistance, Shore D hardness and pencil hardness. The results are shown in Table 6.

TABLE 6

| Polyol | Base resin Viscosity @ 25° C. (cP) | VOC (g/L) | Taber Abrasion (mg loss) | Hardness Shore D | Pencil |
|---|---|---|---|---|---|
| Formulation 1A | 2,800 | 77 | 15.1 | 66 | 3B |
| Comparative 1 | 16,000 | 345 | 29.8 | 42 | F |
| Comparative 2 | 3,900 | 207 | 74 | 20 | 2B |
| Comparative 3 | 1,100 | 29 | 51.5 | 61 | 4B |
| Comparative 4 | 1,500 | 97 | 69.1 | 47 | — |
| Comparative 5 | 13,000 | 0 | 83.9 | 89 | — |

From the results in Table 6, it can be seen that Formulation 1A, prepared with the polyester polyol of the present technology, had lower VOC content compared to the Comparative 1, 2, and 4 formulations. Formulation 1A also had better abrasion resistance than all of the Comparative formulations, and higher Shore D hardness than the Comparative 1, 2, 3, and 4 formulations.

Example 3: Resin Blend Compositions

A polyester polyol prepared in accordance with Example 1 was blended with different amounts of a ketimine resin. Each resin blend was formulated into a polyurethane coating formulation using the general procedure of Example 2 and the general formulation in Table 3. The ketimine amounts were 10% by weight in Formulation 5, and 15% by weight in Formulation 6, based on the weight of the B-side components. Formulations 5 and 6 were evaluated for Shore D and pencil hardness properties, and compared with the Shore D and pencil hardness properties of Formulation 1 and the Comparative formulations. The results are shown in Table 7.

TABLE 7

| Polyol | Shore D | Pencil |
|---|---|---|
| Formulation 1 | 64 | F |
| Formulation 5 | 65 | 2B |
| Formulation 6 | 77 | 2B |
| Comparative 1 | 42 | F |
| Comparative 2 | 20 | 2B |
| Comparative 3 | 61 | 4B |
| Comparative 4 | 47 | — |
| Comparative 5 | 89 | — |

Table 7 shows that Shore D hardness increased with the addition of ketimine. (Compare Formulation 5 and 6 with Formulation 1). The addition of ketimine also resulted in increased Shore D hardness compared to the Comparative 1, 2, 3, and 4 formulations.

Example 4: Chemical Resistance Testing

Formulations 1-6, Formulation 1A, and Comparative formulations 1-5 were evaluated for chemical resistance in different testing solutions. The results after 4 weeks of testing are shown in Table 8. The numbers in the table represent the change in total weight percent of each sample after the duration of the test. Numbers closer to zero indicate less change in sample weight and better chemical resistance. If the sample was destroyed before the end of the 4 weeks, that is also noted in the table.

TABLE 8

Chemical Resistance (4 week immersion)[1]

| Polyol | 10%[2] HCl | 10%[2] $H_2SO_4$ | 10%[2] $HNO_3$ | 10%[2] Acetic | 10%[2] NaOH | 10%[2] $NH_4OH$ | MEK | Xylene | EtOH | Skydrol® | Brake FL | $H_2O$ |
|---|---|---|---|---|---|---|---|---|---|---|---|---|
| Formulation 1 | 1.22 | 1.71 | 2.35 | 2.80 | 3.89 | 7.39 | D 1WK | 1.09 | 18.33 | 1.80 | 7.01 | 1.89 |
| Formulation 1A | 2.31 | 2.31 | 3.80 | 3.53 | 5.93 | 10.55 | 25.95 | 1.54 | 18.66 | 5.18 | 4.98 | 2.50 |
| Formulation 2 | 1.46 | 1.91 | 2.53 | 2.76 | 0.44 | 7.51 | 25.37 | 0.90 | 17.62 | 0.64 | 2.54 | 2.20 |
| Formulation 3 | 1.50 | 1.88 | 2.61 | 3.03 | 4.23 | 3.90 | 24.63 | 0.59 | 19.42 | 0.77 | 2.75 | 2.15 |
| Formulation 4 | 1.77 | 1.97 | 3.41 | 3.51 | 6.43 | 3.77 | 24.66 | 0.71 | 26.25 | 0.69 | 3.15 | 2.41 |
| Formulation 5 | 1.46 | 1.78 | 2.61 | 2.91 | 7.70 | 8.91 | 21.79 | 0.62 | 17.63 | 0.74 | 3.33 | 2.11 |
| Formulation 6 | 1.44 | 1.86 | 2.89 | 3.27 | 4.52 | 8.42 | 22.82 | 0.72 | 19.94 | 0.63 | 3.31 | 2.27 |
| Comparative 1 | −4.81 | −1.65 | −0.45 | −0.68 | −3.58 | −1.88 | D 1day | −0.51 | −0.35 | −3.08 | −1.69 | −2.63 |
| Comparative 2 | D 3day | −4.10 | −4.68 | −1.85 | −4.39 | −5.22 | D 1day | D 1wk | 6.78 | 0.95 | 0.29 | −3.66 |
| Comparative 3 | 0.84 | 1.18 | 1.20 | 1.78 | 0.60 | 1.19 | D 1day | D 2wk | D 2wk | 6.29 | 7.56 | 1.16 |
| Comparative 4 | 0.61 | 1.01 | 1.63 | 1.04 | 0.83 | 2.92 | D 1day | D | 27.56 | 5.86 | 6.70 | 1.25 |
| Comparative 5 | 0.64 | 0.98 | 0.93 | 2.27 | 0.45 | 0.65 | D 2wk | 8.52 | 8.56 | 1.01 | 4.50 | 0.50 |

D = Destroyed
[1]Numbers are change in total weight percent.
[2]10% by weight in aqueous solution.

The results in Table 8 show that the polyurethane coatings prepared from Formulations 1-6 and 1A had better performance (i.e., less weight loss) in 10% HCl aqueous solution than the Comparative formulations 1 and 2, and generally had better performance in MEK test solutions than the Comparative formulations 1-5. Formulations 1-6 and 1A also had significantly better performance in xylene than the Comparative formulations 2-5. Formulations 1-6 and 1A had comparable performance to the Comparative formulations 1-5 in 10% aqueous solution NaOH, Skydrol®, and water. The addition of ketimine improved the resistance to MEK, xylene, Skydrol®, and brake fluid (compare Formulation 1 with Formulations 5 and 6).

Example 5: UV Resistance and Gloss Testing

Samples prepared from Formulations 1-3, and the Comparative 1 and 2 formulations were evaluated for color change (ΔE). For ΔE, the ideal value is zero, indicating no color change has occurred. Accordingly, the least amount of ΔE change indicates better UV resistance. The results of the ΔE measurements for Formulations 1-3 and the Comparative 1 and 2 formulations are graphically illustrated in FIG. 1.

Figure 1:
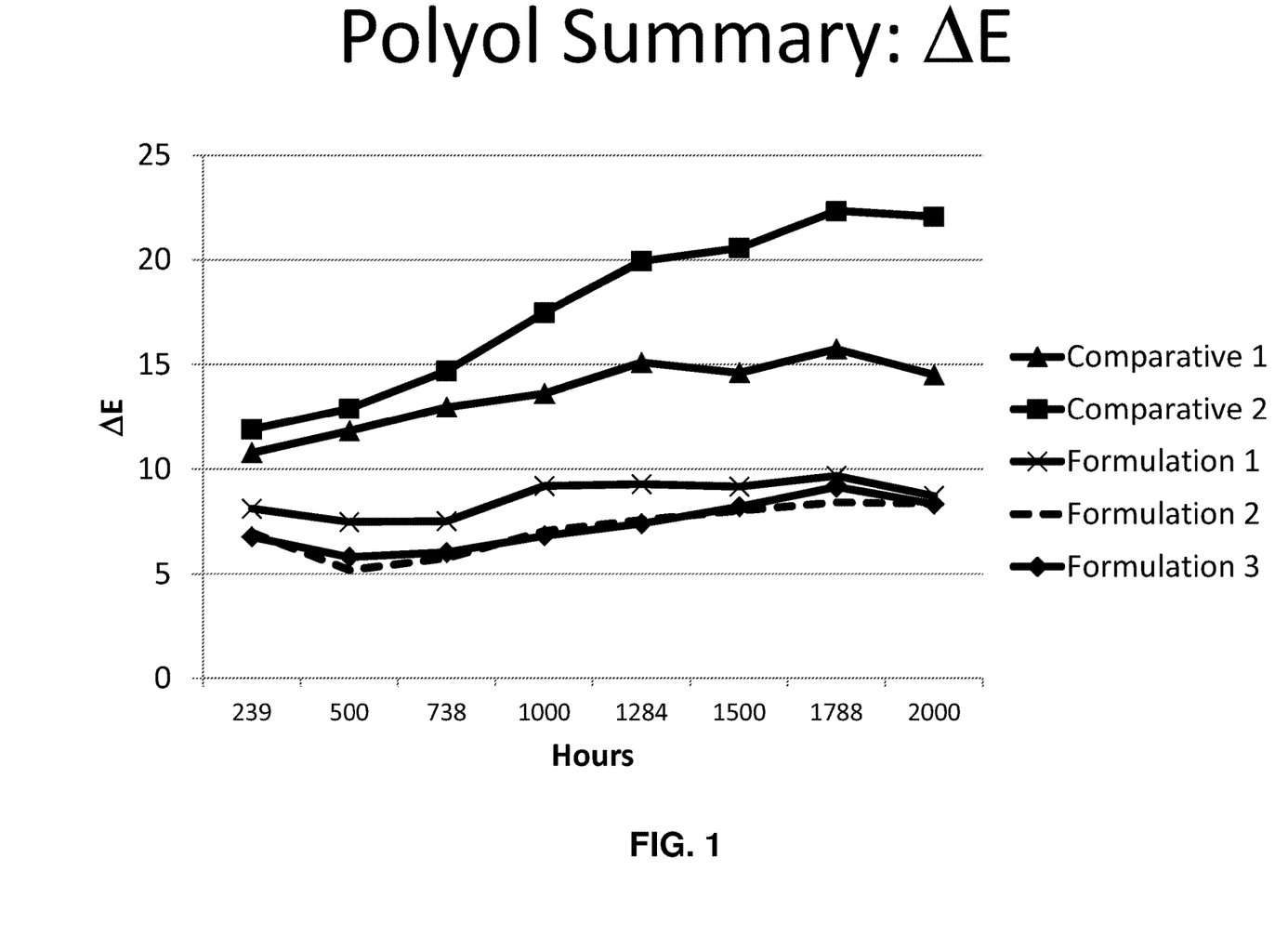
FIG. 1 is a graph comparing the color stability of polyurethane formulations of the present technology against commercial coating formulations after UV exposure over a period of 2000 hours.

As shown in FIG. 1, the samples prepared from Formulations 1-3 of the present technology had a smaller ΔE change than the ΔE changes for the samples prepared from either of the Comparative 1 and 2 formulations. The smaller ΔE changes for Formulations 1-3 indicate better UV resistance and stability compared to the Comparative 1 and 2 formulations.

Figure 2:
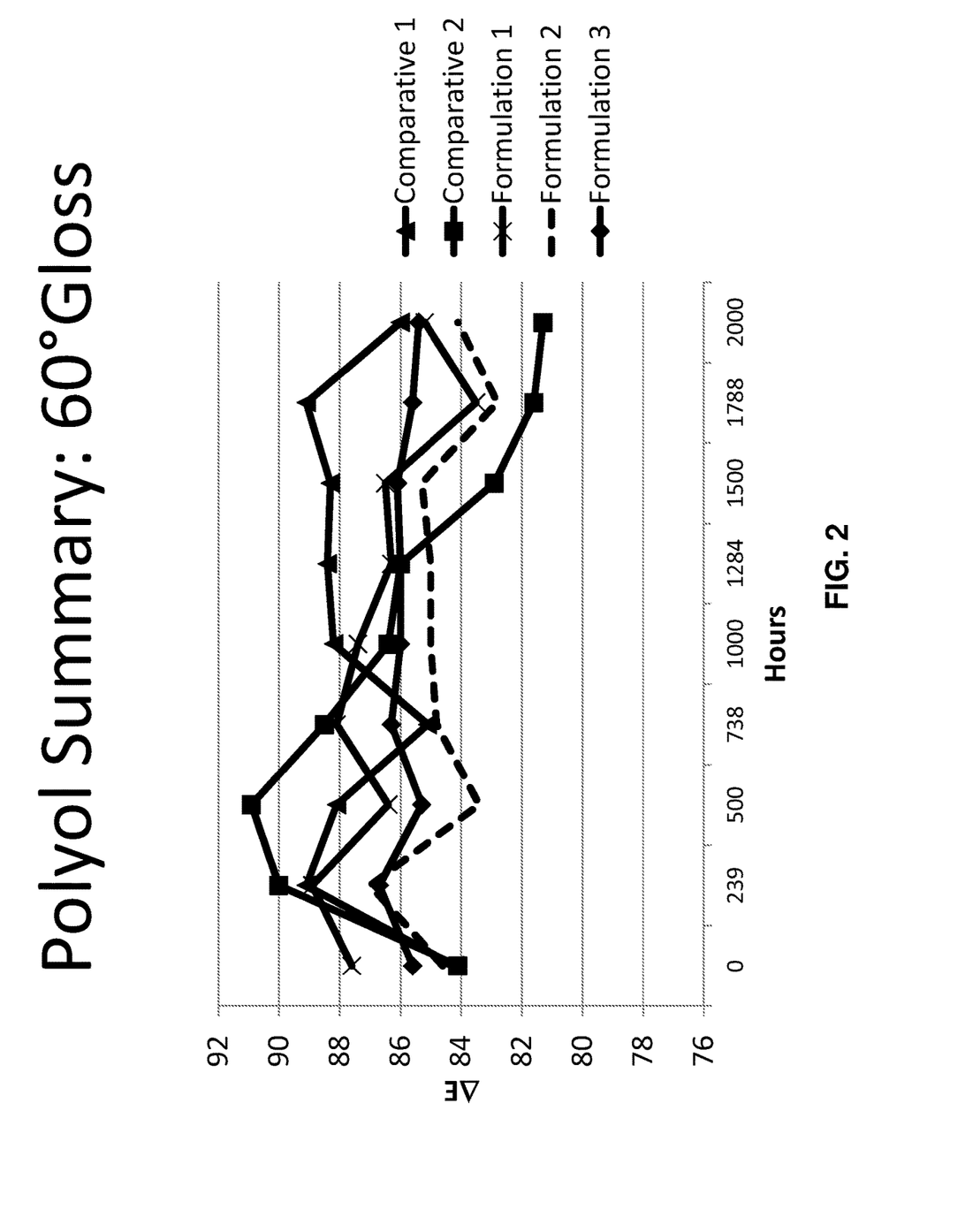
FIG. 2 is a graph showing the gloss levels for polyurethane formulations of the present technology and commercial coating formulations after UV exposure over a period of 2000 hours.

The samples were also evaluated for change in gloss. Ideally, there should be no change in gloss over time. Gloss levels that are consistent when measured after different time intervals indicate good UV resistance and stability. The results of the gloss measurements for samples prepared from Formulations 1-3 and the Comparative 1 and 2 formulations are graphically illustrated in FIG. 2. As shown in FIG. 2, although there is some loss of gloss for Formulations 1-3, the gloss levels for Formulations 1-3 are relatively stable over time. FIG. 2 also shows that the gloss levels for Formulations 1-3 are more stable than the gloss levels of Comparative formulation 2. Formulations 2 and 3 of the present technology, containing 10% and 20% by weight oxazolidine, respectively, had the smallest change in gloss compared to the other formulations, indicating these formulations had very good stability. Comparative formulation 2 had the largest change in gloss, while Comparative formulation 1 and Formulation 1 were fairly comparable in terms of the magnitude of change. However, Comparative formulation 1 is a higher viscosity polyol and has higher VOC levels than Formulation 1. Formulation 1 can provide lower VOC levels but still deliver adequate gloss stability.

Figure 3:
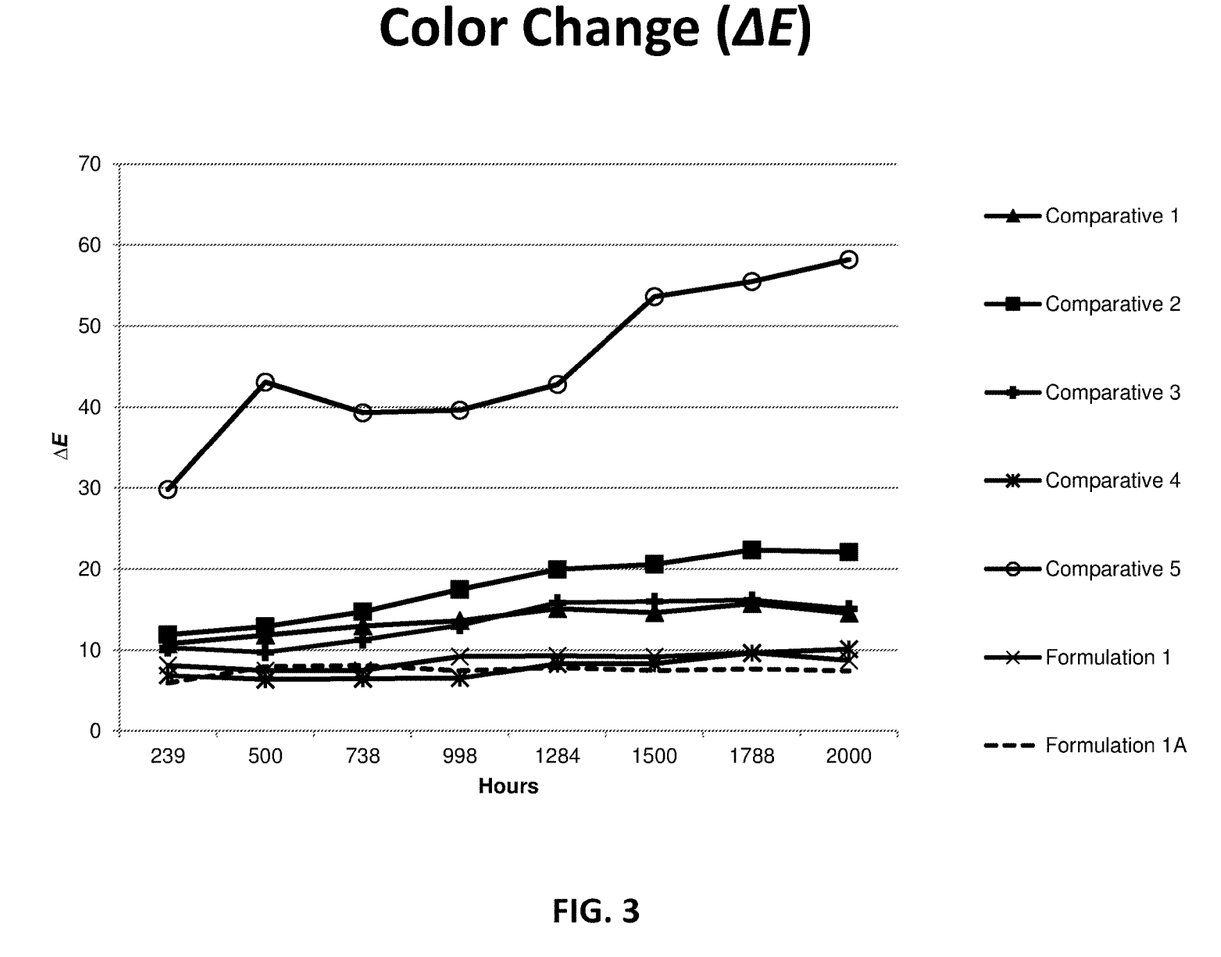
FIG. 3 is a graph showing the color stability of polyurethane formulations of the present technology and commercial coating formulations after UV exposure over a period of 2000 hours.

Samples prepared from Formulations 1 and 1A, and the Comparative 1-5 formulations were evaluated for color change (ΔE). As noted above, the least amount of ΔE change indicates better UV resistance. The results of the ΔE measurements for these formulations are graphically illustrated in FIG. 3. As shown in FIG. 3, the Formulation 1 and 1A formulations of the present technology had comparable or better UV resistance and color stability than the Comparative formulations, with Example 1A showing the best color stability.

Figure 4:
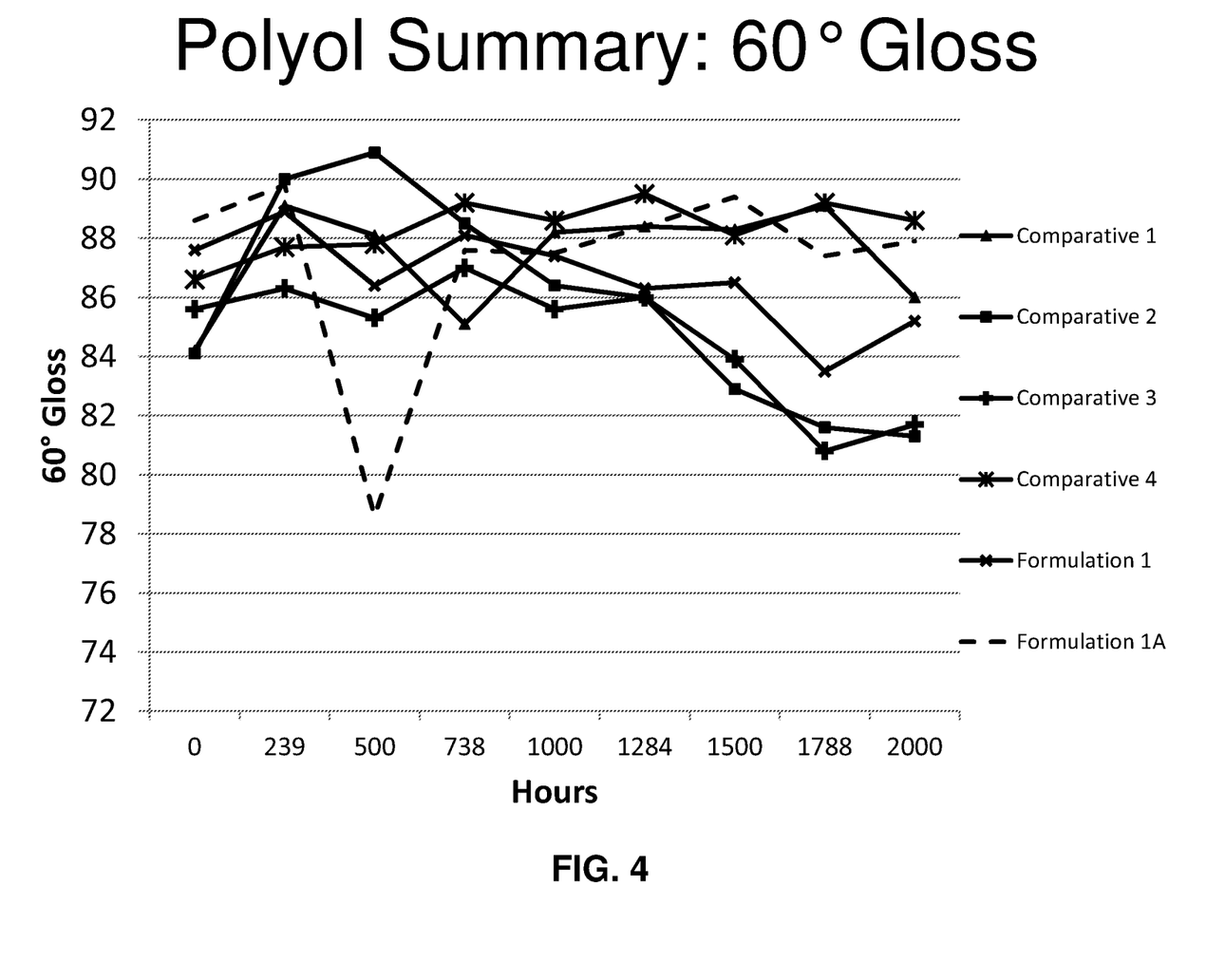
FIG. 4 is a graph showing the gloss levels for polyurethane formulations of the present technology and commercial coating formulations after UV exposure over a period of 2000 hours.

The Formulation 1, 1A, and Comparative 1-5 formulation samples were also evaluated for change in gloss after UV exposure over 2000 hours. Gloss levels that are consistent when measured after different time intervals indicate good UV resistance and stability, and ideally there should be no change in gloss levels over time. The results of the gloss measurements are graphically illustrated in FIG. 4. Since the Comparative 5 formulation (epoxy) has very poor UV resistance and stability, gloss measurements for the Comparative 5 formulation (epoxy) have been omitted from FIG. 4 to better show the differences between the formulations of the present technology and the Comparative formulations 1-4. As shown in FIG. 4, Formulation 1 and 1A of the present technology have gloss levels that are relatively stable over time, and show better gloss stability than the Comparative 2 and 3 formulations when approaching 2000 hours of UV exposure.

Figure 5:
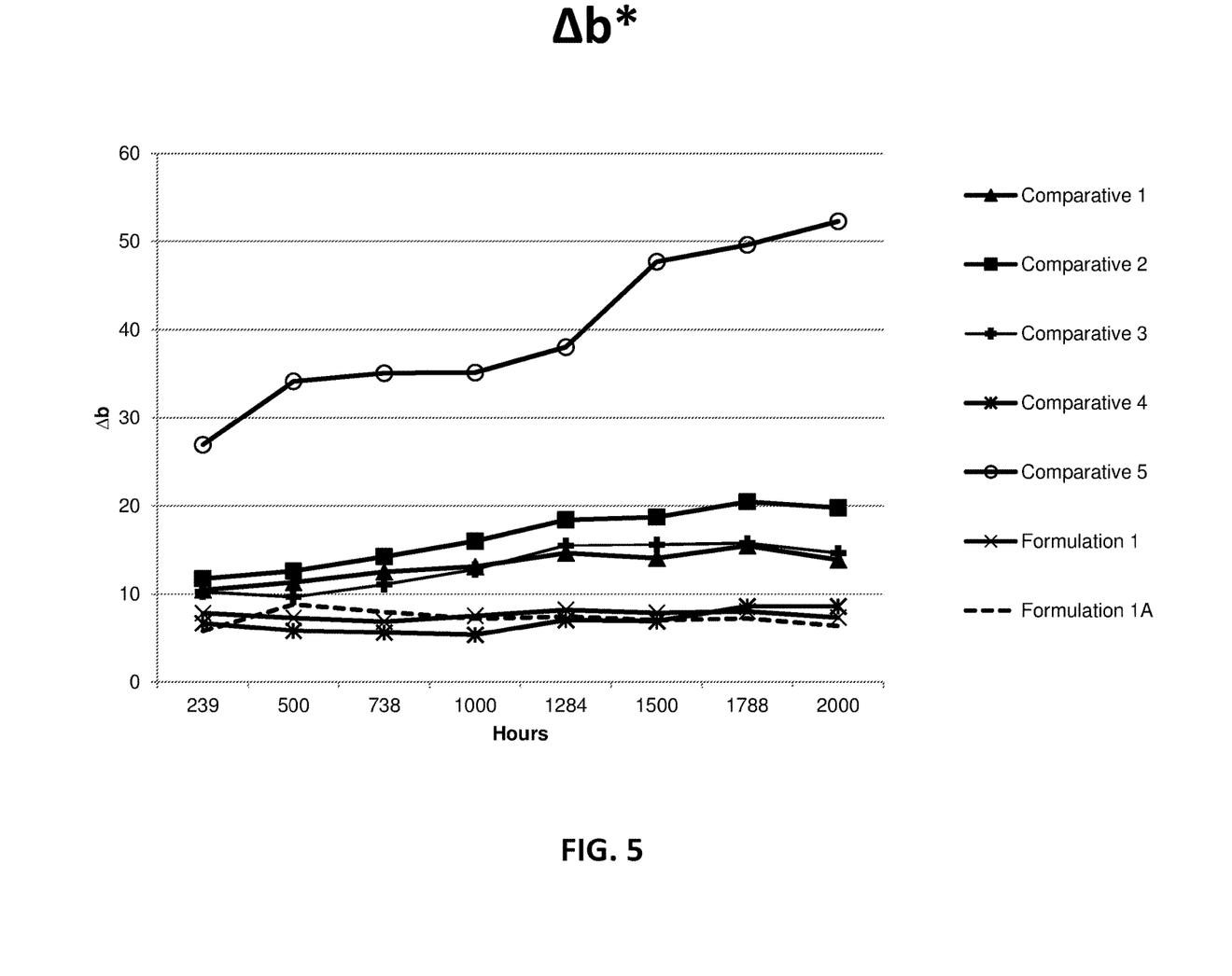
FIG. 5 is a graph showing the Δb* levels for polyurethane coating formulations of the present technology and commercial coating formulations after UV exposure over a period of 2000 hours.

Formulations 1 and 1A, and the Comparative 1-5 formulations were evaluated for changes in b* values over time. For Δb*, the ideal value is zero, indicating no yellowing of the sample. Yellowness was evaluated using (Δb*) of a formulated clear coating applied over an automotive white basecoat panel. As shown in FIG. 5, the Comparative 5 (epoxy) formulation had the greatest yellowness change followed by the Comparative 2 (acrylic) formulation after 2000 hours of exposure. Formulations 1 and 1A were either better or comparable to the other Comparative formulations.

Example 6: Adhesion Testing

Polyurethane coatings were prepared from Formulation 1 and Formulation 1A described above, following the general procedure of Example 2, except that a fluorocarbon additive was added to each formulation to reduce surface tension of the coating composition. Coatings were also prepared from each of the Comparative formulations 1-5, except that a fluorocarbon additive was added to each coating composition to reduce surface tension of the coating composition. Having a reduced surface tension allows the coating composition to provide better substrate wetting.

Each of the coating compositions was applied to a variety of different substrates to evaluate the adhesion or bonding of the coating to the substrate. The coating compositions were drawn down on each substrate using a 150 micron wire-wound drawdown bar, and allowed to cure at ambient temperature for at least 2 weeks. Adhesion of the coatings was measured by the cross-hatch tape test according to ASTM D 3359-95a. Briefly, a lattice pattern with cuts in each direction is made in the film to the substrate. Pressure-sensitive tape is applied over the lattice and then removed. Test Method B is used to evaluate adhesion, wherein a rating of 5B indicates 0% of the coating is removed, and a rating of 0 indicates greater than 65% of the coating is removed. The results of the adhesion testing are shown in Table 9. A rating of 4B or 5B indicates good adhesion, a rating of 3B indicates fair adhesion, and a rating of 0B-2B indicates poor adhesion.

to rest for 24 hours, and then visually inspected for phase separation. The results are shown in Table 10.

TABLE 10

| Resin Compatibility | | | |
|---|---|---|---|
| Product | | Example 1 Polyol | |
| Loading | 10% | 25% | 50% |
| Polyether Polyol (2 functional) | PC | PC | C |
| Polyether Polyol (4.5 functional) | C | C | C |
| Low MW (about 1,000) Acrylic Polyol | C | PC | C |
| High MW (about 10,000) Acrylic Polyol | PC | PC | C |
| Branched Aliphatic Polyester Polyol | C | C | C |
| Linear Polyester Polyol | C | C | C |
| Methylated Melamine Resin | C | C | C |
| Thermoplastic Acrylic | NC | NC | NC |
| Short Oil Alkyd | PC | PC | PC |
| Medium Oil Alkyd | PC | PC | PC |

C = Compatible;
PC = Partially Compatible;
NC = Not Compatible

"Compatible" indicates a mixture that is fully miscible with no phase separation; "Partially Compatible" indicates a hazy mixture; and "Not Compatible" indicates a mixture that has

TABLE 9

| | Formulation 1 | Formulation 1A | Comparative 1 (Branched Polyester) | Comparative 2 (Acrylic) | Comparative 3 (PES/PET) | Comparative 4 (Aspartic) | Comparative 5 (Epoxy) |
|---|---|---|---|---|---|---|---|
| Substrate | | | | | | | |
| Aluminum (Chromium Treated) | 4B | 5B | 4B | 5B | 5B | 5B | 5B |
| Aluminum (untreated) | 5B | 5B | 5B | 5B | 5B | 5B | 5B |
| Cold-rolled steel (CRS) | 5B | 5B | 0B | 4B | 2B | 5B | 0B |
| Phosphatized steel (Bondrite 1000) | 5B | 5B | 5B | 5B | 5B | 5B | 3B |
| Galvanized steel | 2B | 1B | 0B | 2B | 5B | 3B | 0B |
| PVC (RM 9000) | 5B | 3B | 5B | 0B | 0B | 0B | 0B |
| Thermoplastic polyolefin (D161) | 0B | 0B | 0B | 0B | 0B | 0B | 0B |
| Polypropylene (HSBMCB 1158) | 0B | 0B | 0B | 0B | 0B | 0B | 0B |
| ABS (Cycolac MG38) | 5B | 1B | 0B | 5B | 0B | 5B | 0B |
| Concrete | 5B | 5B | 3B | 5B | 3B | 5B | 5B |
| Polycarbonate (Lexan LS2) | 3B | 5B | 0B | 0B | 0B | 0B | 0B |

The results in Table 9 show that the coating compositions comprising the polyester polyols of the present technology are able to achieve equal or better adhesion to several different substrates compared to the commercial resins used in Comparative formulations 1-5. The improved adhesion allows the polyester polyols to be used in coating compositions that have a wide range of applications.

Example 7: Resin Compatibility

The polyester polyols of the present technology were blended with other resin types to assess the compatibility of the polyols with the other resins. A polyester polyol prepared in accordance with Example 1 was blended with the specified amount (10%, 25%, or 50%) of a commercially available resin as supplied. The resin amounts blended with this polyester polyol are based on total weight of the resin blend. The mixtures were blended by hand for 5 minutes, allowed phase separated. The results in Table 10 show that the polyester polyols of the present technology can be compatible or partially compatible with most of the resin systems tested. The compatibility with other resin systems could be useful in formulating coatings that are based on multiple resin systems. In addition, since the low VOC polyols of the present technology are compatible with some high VOC resins, they can be blended with the high VOC resins to reduce the total VOCs in the resin system.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. A random polyester polyol comprising the reaction product of components forming the random polyester polyol, wherein the components comprise:
   from about 10% to about 59% by weight, based on the total weight of the components forming the random polyester polyol, of (a) a polycarboxylic acid component comprising at least one of a polycarboxylic acid and a polycarboxylic acid derivative;
   from about 5% to about 40% by weight, based on the total weight of the compounds forming the random polyester polyol, of (b) a lactide component comprising at least one of lactide, lactic acid, and a lactic acid derivative; and
   from about 29% to about 80% by weight, based on the total weight of the compounds forming the random polyester polyol, of (c) a polyalcohol component comprising one or more polyalcohols,
   wherein the random polyester polyol has an Acid Value of 10.0 mg KOH/g or less, an OH value of greater than 400 up to about 1100 mg KOH/g, an average molecular weight of less than about 900 g/mol, a functionality greater than 2 to about 6, and a viscosity of about 500 cps to less than about 10,000 cps at 25° C.

2. The random polyester polyol of claim 1, wherein (c) the polyalcohol component comprises one or more of ethylene glycol, diethylene glycol, triethylene glycol, propylene glycol, dipropylene glycol, trimethylene glycol, butylene glycols, neopentyl glycol, 1,6-hexanediol, 2-methyl-1,3-propanediol, 1,3-propane glycol, 1,3-butanediol, 1,4-butanediol, 1,5-pentanediol, 1,2-cyclohexandiol, 1,3-cyclohexanediol, 1,3-cyclohexanedimethanol, 1,4-cyclohexanedimethanol, resorcinol, hydroquinone, poly(oxyalkylene) polyols derived by the condensation of ethylene oxide, propylene oxide, or a combination thereof, glycerol, diglycerol, trimethylolpropane, pentaerythritol, dipentaerythritol, ethoxylated trimethylolpropane, propoxylated trimethylolpropane, sucrose, glucose, fructose, sorbitol, and mannitol.

3. The random polyester polyol of claim 1, wherein (a) the polycarboxylic acid component comprises one or more of straight or branched aliphatic diacids, aromatic diacids, cycloaliphatic diacids, and polycarboxylic acids having a functionality of at least two.

4. The random polyester polyol of claim 1, wherein (a) the polycarboxylic acid component comprises one or more of glutaric acid, adipic acid, succinic acid, maleic acid, fumaric acid, sebacic acid, pimelic acid, octanedioic acid, dodecanedioic acid, azelaic acid, phthalic acid, terephthalic acid, isophthalic acid, citric acid, isocitric acid, trimellitic acid, pyromellitic acid, trimellitic anhydride, and pyromellitic anhydride.

5. The random polyester polyol of claim 1, wherein the components forming the random polyester polyol comprise from about 10% to about 55% by weight, based on the total weight of the components forming the random polyester polyol, of (a) the polycarboxylic acid component.

6. The random polyester polyol of claim 1, wherein the weight ratio of (c) the polyalcohol component to (b) the lactide component is from 10:1 to 1.0:1.

7. The random polyester polyol of claim 1, wherein the components forming the random polyester polyol further comprise a natural oil.

8. A B-side composition for preparing a polyurethane composition, the B-side composition comprising:
   a 100% solids random polyester polyol, wherein the random polyester polyol is the random polyester polyol of claim 1;
   optionally, at least one oxazolidine in an amount of 0% to 60% by weight, or at least one ketimine resin in an amount of 0% to 60% by weight, based on the weight of the B-side composition; and
   optionally, one or more additional components having two or more active hydrogen groups;
   wherein the polyurethane composition is a coating, adhesive, sealant, elastomer, or foam.

9. The B-side composition of claim 8, wherein (c) the polyalcohol component comprises one or more of ethylene glycol, diethylene glycol, triethylene glycol, propylene glycol, dipropylene glycol, trimethylene glycol, butylene glycols, neopentyl glycol, 1,6-hexanediol, 2-methyl-1,3-propanediol, 1,3-propane glycol, 1,3-butanediol, 1,4-butanediol, 1,5-pentanediol, 1,2-cyclohexandiol, 1,3-cyclohexanediol, 1,3-cyclohexanedimethanol, 1,4-cyclohexanedimethanol, resorcinol, hydroquinone, poly(oxyalkylene) polyols derived by the condensation of ethylene oxide, propylene oxide, or a combination thereof, glycerol, diglycerol, trimethylolpropane, pentaerythritol, dipentaerythritol, ethoxylated trimethylolpropane, propoxylated trimethylolpropane, sucrose, glucose, fructose, sorbitol and mannitol.

10. The B-side composition of claim 8, wherein (a) the polycarboxylic acid component comprises one or more of glutaric acid, adipic acid, succinic acid, maleic acid, fumaric acid, sebacic acid, pimelic acid, octanedioic acid, dodecanedioic acid, azelaic acid, phthalic acid, terephthalic acid, isophthalic acid, citric acid, isocitric acid, trimellitic acid, pyromellitic acid, trimellitic anhydride, and pyromellitic anhydride.

11. The B-side composition of claim 8, wherein the components forming the random polyester polyol comprise from about 10% to about 55% by weight, based on the total weight of the components forming the random polyester polyol, of (a) the polycarboxylic acid component.

12. The B-side composition of claim 8, wherein the weight ratio of (c) the polyalcohol component to (b) the lactide component is from 10:1 to 1.0:1.

13. The B-side composition of claim 8, wherein the one or more additional components having two or more active hydrogen groups are selected from polyester polyols, polyether polyols, polyetherester polyols, polycarbonate polyols, acrylic polyols, amine polyols, polycaprolactones, silicones, hydroxyl-containing thioethers, aspartic resins, and ketimine resins.

14. The B-side composition of claim 8, wherein the 100% solids random polyester polyol is present in an amount of 30% to 95% by weight, based on the weight of the B-side composition.

15. The B-side composition of claim 8, wherein the at least one oxazolidine is present in an amount of greater than zero to 60% by weight, based on the weight of the B-side composition.

16. The B-side composition of claim 8, wherein the at least one ketimine resin is present in an amount of greater than zero to 60% by weight, based on the weight of the B-side composition.

17. A 2-part polyurethane coating composition comprising an A-side composition and a B-side composition, wherein the B-side composition comprises:
   a 100% solids random polyester polyol, wherein the random polyester polyol is the random polyester polyol of claim 1;

optionally, at least one oxazolidine in an amount of 0% to 60% by weight, or at least one ketimine resin in an amount of 0% to 60%, based on the weight of the B-side composition; and optionally, one or more additional components having two or more active hydrogen groups; and wherein the A-side composition comprises an isocyanate component comprising at least one polyisocyanate, in an amount to provide a proportion of NCO to OH groups of about 0.9:1 to about 1.3:1.

18. The 2-part polyurethane coating composition of claim 17, having a VOC content of less than 200 g/liter.

19. The 2-part polyurethane coating composition of claim 17, wherein the isocyanate component comprises a biuret or isocyanurate of hexamethylene diisocyanate having a nominal functionality of about three and an NCO content of about 23 weight percent.

20. The 2-part polyurethane coating composition of claim 17, wherein the 100% solids random polyester polyol is present in an amount of 30% to 95% by weight, based on the weight of the B side composition.

21. A cross-linked polyurethane composition comprising a reaction product of the 2-part polyurethane coating composition of claim 17;
wherein the cross-linked polyurethane composition has a Shore D hardness of at least 60.

22. The cross-linked polyurethane composition of claim 21, wherein the cross-linked polyurethane composition has a König hardness of greater than 60 oscillations.

23. The 2-part polyurethane coating composition of claim 17, wherein the components forming the random polyester polyol comprise from about 10% to about 55% by weight, based on the total weight of the components forming the random polyester polyol, of (a) the polycarboxylic acid component.

24. A cross-linked polyurethane composition comprising a reaction product of the 2-part polyurethane coating composition of claim 23;
wherein the cross-linked polyurethane composition has a Shore D hardness of at least 60.

25. The cross-linked polyurethane composition of claim 24, wherein the cross-linked polyurethane composition has a König hardness of greater than 60 oscillations.

* * * * *